United States Patent
Nadas et al.

(10) Patent No.: US 6,621,504 B1
(45) Date of Patent: Sep. 16, 2003

(54) EDITOR FOR EFFECT TREE PARAMETERS

(75) Inventors: Thomas P. Nadas, Montreal (CA); Shailendra Mathur, Beaconsfield (CA); Michael C. Sheasby, Boucherville (CA); Michel Eid, Montreal (CA)

(73) Assignee: Avid Technology, Inc., Tewksbury, MA (US)

(*) Notice: Subject to any disclaimer, the term of this patent is extended or adjusted under 35 U.S.C. 154(b) by 0 days.

(21) Appl. No.: 09/369,688

(22) Filed: Aug. 6, 1999

(51) Int. Cl.[7] ................................................. G09G 5/00
(52) U.S. Cl. ........................................ 345/723; 745/726
(58) Field of Search ................................. 345/723, 764, 345/762, 716, 722, 738, 726

(56) References Cited

U.S. PATENT DOCUMENTS 5,668,639 A * 9/1997 Martin ........................ 380/52
5,781,188 A * 7/1998 Amiot et al. ................ 345/723
5,999,190 A * 12/1999 Sheasby et al. ............. 345/431
6,011,562 A * 1/2000 Gagne et al. ................ 345/473
6,154,601 A * 11/2000 Yaegashi et al. ............. 386/52
6,204,840 B1 * 3/2001 Petelycky et al. ........ 707/500.1
6,317,142 B1 * 11/2001 Decoste et al. ............. 345/762

FOREIGN PATENT DOCUMENTS

WO    WO 98/06099    * 2/1998 ......... G11B/27/034

* cited by examiner

Primary Examiner—John Cabeca
Assistant Examiner—Tadesse Hailu
(74) Attorney, Agent, or Firm—Peter J. Gordon

(57) ABSTRACT

The present invention provides for a property editor in a graphics image system in order to specify parameter values for effects in an effect tree. A separate instance of the property editor is not invoked for each effect within the effect tree, but rather the property editor permits the modification of multiple effects from the same instance of the editor. Advantageously, the user is not required to navigate between a view of the effect tree and the property editor in order to edit effects.

14 Claims, 7 Drawing Sheets

EDITOR FOR EFFECT TREE PARAMETERS

FIELD OF THE INVENTION

The present invention relates generally to an editor for specifying parameter values characterizing the properties of an effect on an object, and more particularly to an editor that supports multiple effects in a single instance of the editor.

BACKGROUND OF THE INVENTION

Computer software is routinely used to depict graphic images on a computer display, under the control of specially designed graphics software. The graphics software is meant to execute in conjunction with an operating system that supports the graphics capabilities of the system; i.e. the software must understand graphics concepts such as brush, pen, and color support. Dedicated graphics processors and general purpose computer systems with high speed processors and large, high resolution monitors have increased the ability to display high quality graphics when used in conjunction with the graphics software.

Graphics software packages that run on various hardware configurations are commercially available. Video editing and computer animation applications are the typical uses of the software. Softimage of Montreal, Canada provides an example of computer graphics software that is commercially available. This software provides for a filter capability to modify video and animation clips, according to the specifications of the user.

Filters may implement one or more effects that are applied to a clip of video, audio, animation, or other types of time-based information. Examples of these effects include a brush effect for painting the clip, a dissolve effect for transitioning between clips, and a color correction effect for selectively changing a specified color in a clip to a new color. Of course other effects are possible, and it is not intended that those identified above are the only ones contemplated.

The filtering process includes receiving a clip of video or animation information, applying the effect to the clip, and outputting the desired effect. Effects may be chained together to form an "effect tree" for implementing more complex effects. In essence, an "effect tree" is a directed acyclic graph of effects. The output of one effect is input to a subsequent effect, and thus effects can be applied in a layered or sequential manner. A typical effect tree operates on a set of input images by passing them through one or more image effects such as a blur or tint, and then mixing them together using operations such as "multiply" or "over".

Each effect in the tree is an object that publishes a set of property pages for describing or defining the capabilities of the effect. The result of the effect on an input image is then determined by changing the parameter values that define these capabilities. Typically, an individual "property editor" is provided for each different effect, allowing the parameter values for only that effect to be modified by the user.

An effect tree is usually presented as a graph in which each effect within the effect tree is a node of the graph. Each effect is represented in the graph as an icon or otherwise identified object. The graph depicts the input to each node of the effect tree and its resulting output. To modify an individual effect within the effect tree, the user selects the icon representative of the desired effect in order to invoke the related property editor associated with only that effect. A window for the individual property editor is subsequently opened and the properties or parameters defining the effect are made available for modification.

To modify another effect in the effect tree, the user must return to the graph of the effect tree to select the property editor associated with the desired effect. For each effect that is to be modified, the effect tree must be reselected, and the effect identified in order to invoke the associated property editor. Unfortunately, the user is forced to return to the effect tree in order to select the effect each time a new effect is edited which necessitates navigating back and forth between the effect tree graph and the property effect editors.

What is desired is an effect tree structure and an associated property editor that avoids the frequent navigating between the view of the effect tree and the property editor in order to select another effect for processing.

SUMMARY OF THE INVENTION

The present invention advantageously provides for a property editor in a graphics image system in order to specify parameter values for effects in an effect tree. A separate instance of the property editor is not invoked for each effect within the effect tree, but rather the property editor permits the modification of multiple effects from the same instance of the editor. Furthermore, a user is not required to navigate between a view of the effect tree and a property editor to select an effect for editing.

In one aspect of the invention, a property editor is implemented in software for an effect tree that includes the ability to recognize the structure of the effect tree-and present an effect tree view in graphical form.

In another aspect of the invention, a property editor for an effect tree supports specifying parameter values for multiple effects within a single instance of the editor.

In a yet still further aspect of the invention, the structure of an effect tree enables users to distinguish effects within its structure to be exposed for editing within property editors while other effects are ignored and not exposed in an effort to simplify the editing experience.

BRIEF DESCRIPTION OF THE DRAWINGS

A specific embodiment of the invention will now be described, by way of example, with reference to the accompanying drawings in which.

DETAILED DESCRIPTION

In the following discussion, the present invention is described for illustrative purposes with reference to the editing of video information. However, one of ordinary skill in the art will recognize that the invention, in it broadest aspect, is applicable to applications other than video applications, and it is not intended that the scope of the invention be so limited. For example, the present invention is also applicable to the editing of audio data, and to media data in general.

Computer Imaging System

Figure 1:
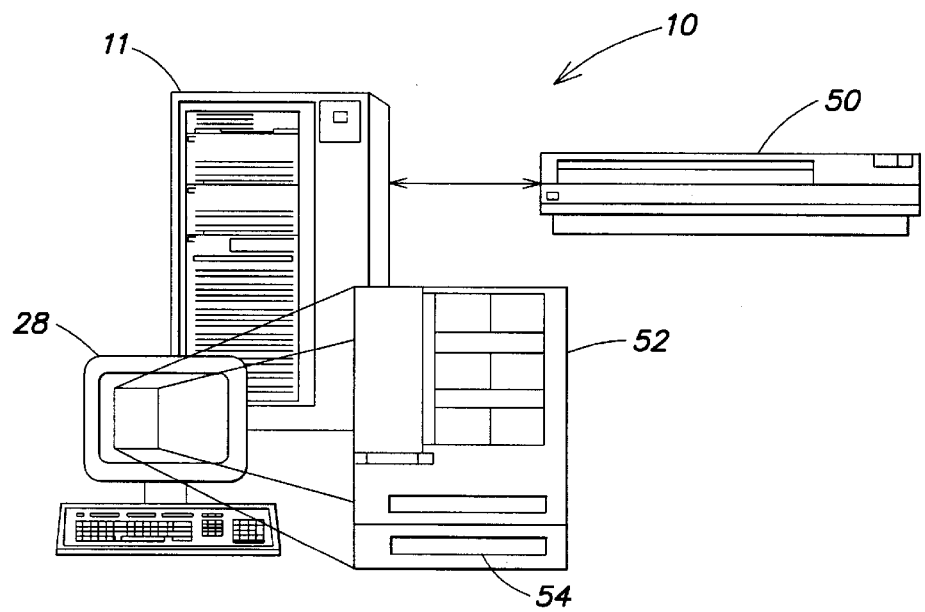
FIG. 1 is a drawing of a computer system suitable for implementing a system for editing effect trees, according to the present invention.
Figure 2:
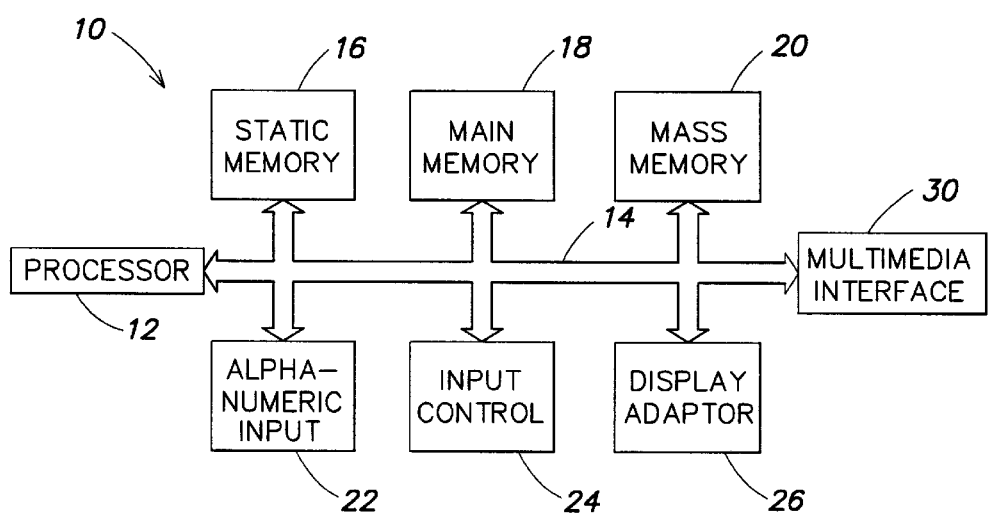
FIG. 2 depicts the hardware components of the computer system of FIG. 1 in further detail.

A computer graphics imaging system 10 is schematically depicted in FIG. 1 and FIG. 2. The graphics imaging system 10 includes a computer 11 that has a central processing unit (CPU) 12, a system bus 14, a static memory 16, a main memory 18, a mass memory 20, an alphanumeric input device 22, a pointer device 24 for manipulating a cursor and making selections of data, and a display adapter 26 for coupling control signals to a video display 28 such as a computer monitor. Since the graphics imaging system 10 is particularly suited to high resolution, high-speed graphics imaging the display or monitor 28 is most preferably a high-resolution wide screen display.

The CPU 12 executes imaging software described below to allow the system 10 to render high quality graphics images on the monitor 28. The CPU 12 comprises a suitable processing device such as a microprocessor, for example, and may comprise a plurality of suitable processing devices. The CPU 12 executes instructions stored in the static memory 16, main memory 18, and/or mass memory 20.

The static memory 16 may comprise read only memory (ROM) or any other suitable memory device. The static memory may store, for example, a boot program for execution by CPU 12 to initialize the graphics imaging system 10. The main memory 18 may comprise random access memory (RAM) or any other suitable memory device. The mass memory 20 may include a hard disk device, a floppy disk, an optical disk, a flash memory device, a CDROM, a file server device or any other suitable memory device. For this detailed description, the term memory comprises a single memory device and any combination of suitable devices for the storage of data and instructions.

The system bus 14 provides for the transfer of digital information between the hardware devices of the graphics imaging system 10. The CPU 12 also receives data over the system bus 14 that is input by a user through alphanumeric input device 22 and/or the pointer device 24. The alphanumeric input device 22 may comprise a keyboard, for example, that comprises alphanumeric keys. The alphanumeric input device 22 may comprise other suitable keys such as function keys for example. The pointer device 24 may comprise a mouse, track-ball, and/or joystick, for example, for controlling the movement of a cursor displayed on the computer display 28.

The graphics imaging system 10 of FIG. 1 also includes display adapter hardware 26 that may be implemented as a circuit that interfaces with system bus 14 for facilitating rendering of images on the computer display 28. The display adapter hardware 26 may, for example, be implemented with a special graphics processor printed circuit board including dedicated random access memory that helps speed the rendering of high resolution, color images on a viewing screen of the display 28.

The display 28 may comprise a cathode ray tube (CRT) or a liquid crystal display particularly suited for displaying graphics on its viewing screen. The invention can be implemented using high-speed graphics workstations as well as personal computers having one or more high-speed processors.

The graphics imaging system 10 utilizes specialized graphics software particularly suited to take advantage of the imaging hardware included in the display system 10 depicted in FIG. 1 and FIG. 2. The software implements non-linear editing, compositing, audio mixing, and graphics design suites which are used to create multimedia presentations. Source material for use with such a system can be obtained from a media storage device 50 that can include videotape, film reel, and digitally recorded videodisks. The source material can also be in the form of previously digitized materials stored on a computer memory 20 such as computer generated animations, graphic images or video files stored on a large capacity hard or fixed disk storage device. To utilize the storage images from the media storage 50, the system 10 includes a multi-media interface 30 for converting image data into a form suitable for use by the software executing on CPU 12 and display adapter 26. A representative display by the graphics software presents multiple images 52 of different resolutions.

Graphics Imaging User Interface

Figure 3:
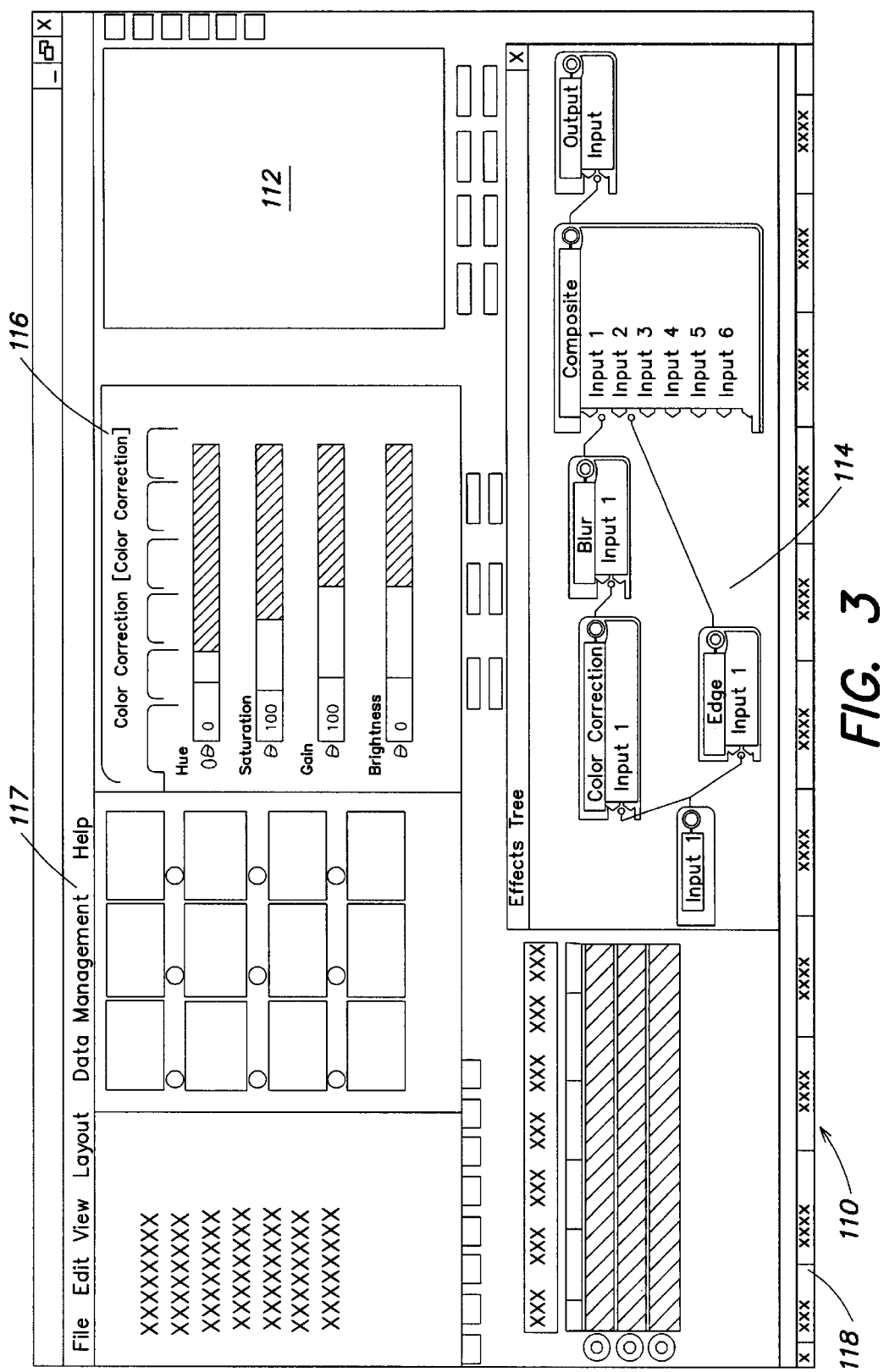
FIG. 3 depicts a user interface, according to the invention, that includes a property editor for modifying effects in an effect tree.

FIG. 3 illustrates a typical user interface or screen display 110 for use in graphics imaging by a graphics design toolset that forms a part of the software package. The screen display includes an image viewing area 112, an effect tree viewing area 114 for viewing the current effect tree, and a property editor region 116 for displaying an executing property editor associated with the effect tree depicted in the effect tree view area 114. The user interface may include a number of sculpted buttons that are actuated by selecting or clicking on the button with the cursor control device 24. The graphics software is executed under an operating system that includes functions for creating a frame window having a menu bar 117. A taskbar 118 located along side of the effect tree view area 114 allows the user to switch between tasks by activating or selecting different icons in the taskbar 118. The graphic design suite having the user interface depicted in FIG. 3 is launched by choosing or selecting a graphics icon from the multiple icons displayed in the taskbar. Others of the multiple icons cause the software o display graphics particularly suited for other tasks such as editing, audio mixing, or combining multiple video layers into a combined audiovisual output.

The Effect Tree

The graphics software of graphics imaging system 10 includes the capability for a user to specify certain effects that can be applied to modify input such as video images and animation. For example, the software may support a "blur" effect that results in the blurring of an input image. In another example, a "tint" effect applies a tint to the received image. An effect is a digital filter for modifying in some manner an input image to produce an output image. Typically, the effect is characterized by a group of parameter values that determine the properties of the effect. These parameter values are adjustable, by a user through a property editor that is designed specifically for that purpose. Using again the blur effect as an example, the degree of blur that is to be applied to an image is a property of the effect and may be specified as a value having a range from 0–100. The 0 value specifies that no blurring is to occur, and a value of 100 indicates the image is to be fully blurred. By modifying this value through the associated property editor for the effect, the operation of the blur is similarly defined.

Figure 4A:
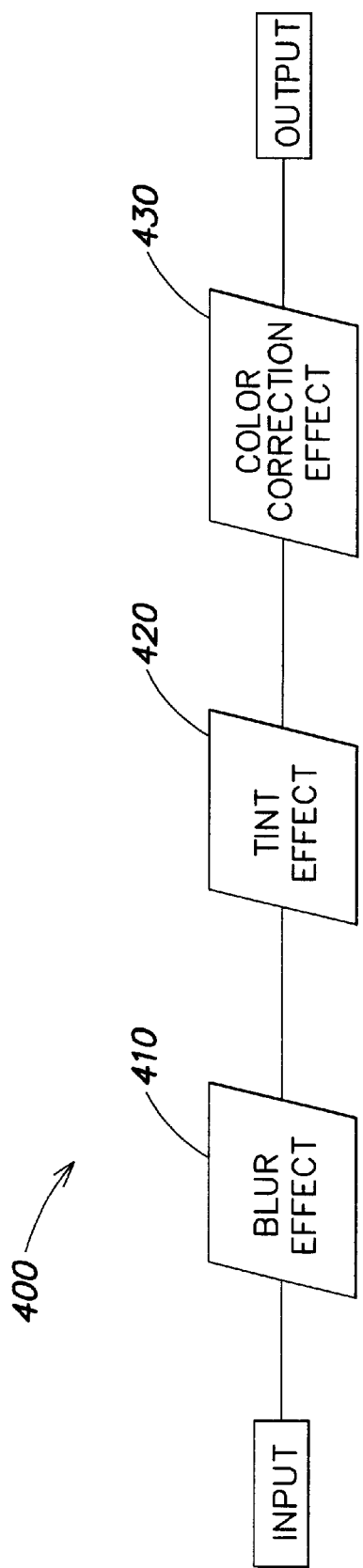
FIG. 4A depicts one embodiment of an effect tree according to the invention.

As is shown in FIG. 4A, multiple effects may be linked together to form a more complex effect. The output of one effect is the input to another effect, and thus this chain of effects may implement a sequence of actions that are applied to the input image. In FIG. 4A, we see that the output of a "blur" effect 410 is input to a "tint" effect 420 and that the output of that effect is further input into a "color change" effect 430. This sequence of effects is termed an "effect tree" 400 because it describes in the most general case a sequence of individual effects, arranged in a branch-like structure, that are applied to an input image. Furthermore, there is no loop back capability to provide feedback to an earlier effect, nor is looping in general permitted.

Figure 4B:
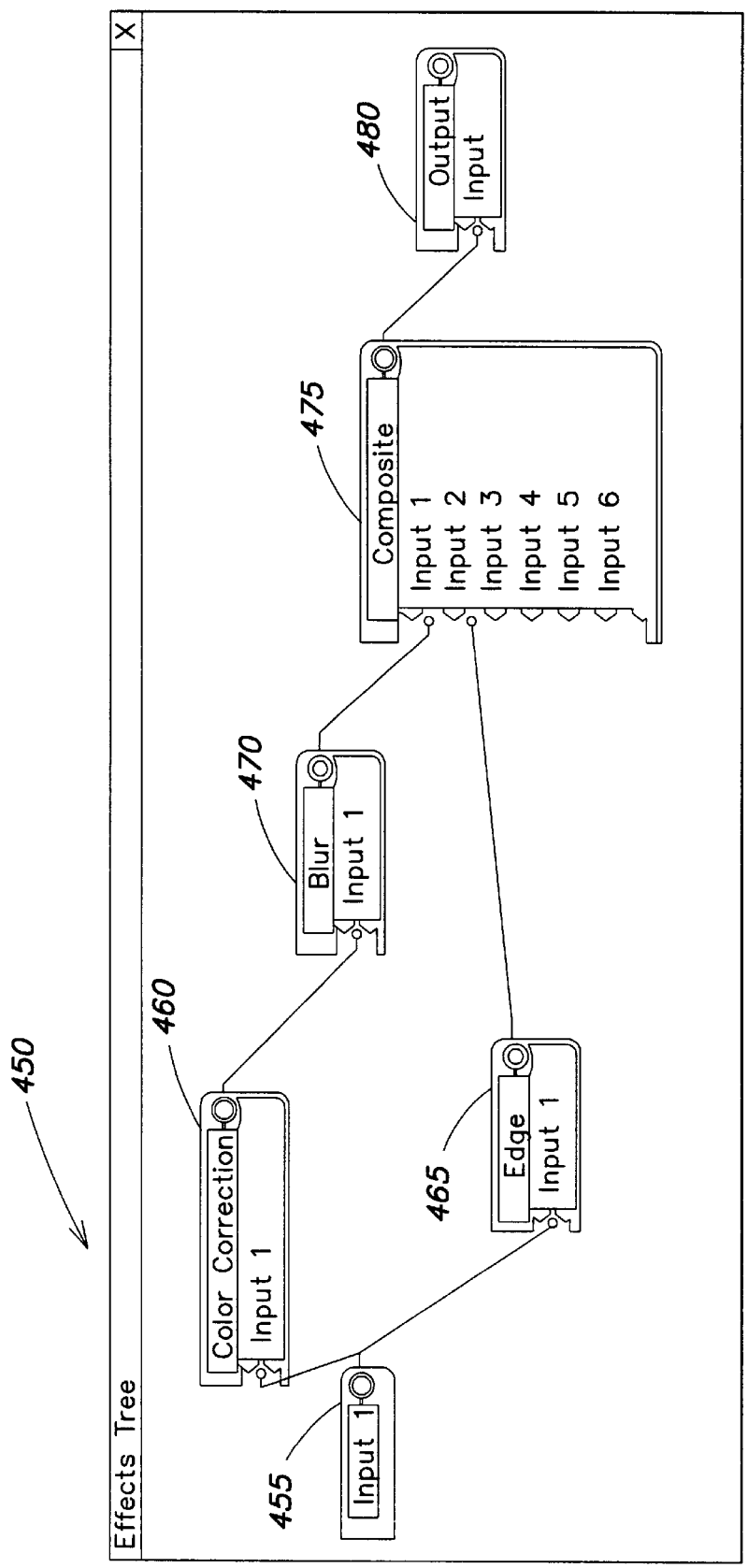
FIG. 4B depicts a further embodiment of an effect tree according to the invention.

While FIG. 4A shows an effect tree 400 that is structured in a simple linear arrangement, FIG. 4B shows a further example of an effect tree 450 that includes a tree-like branch structure. Effect tree 450 is comprised of a color correction effect 460, an edge effect 465, a blur effect 470, and a composite effect 475 for blending the effects into an output 480. In this effect tree structure the input image 455 is introduced to both the color correction effect 460 and the edge effect 465. The output of the color correction effect 460 is then input to the blur effect 470 before blending of that output with the output from the edge effect 465 at the composite effect 475. In this structure, it is seen that the nodes in the effect tree can have multiple inputs as shown by the composite effect 475. Furthermore, the effect processing may consist of effects being applied in parallel to different instances of an input as shown by the parallel effect processing for the color correction effect 460 and the edge effect 465.

Figure 4C:
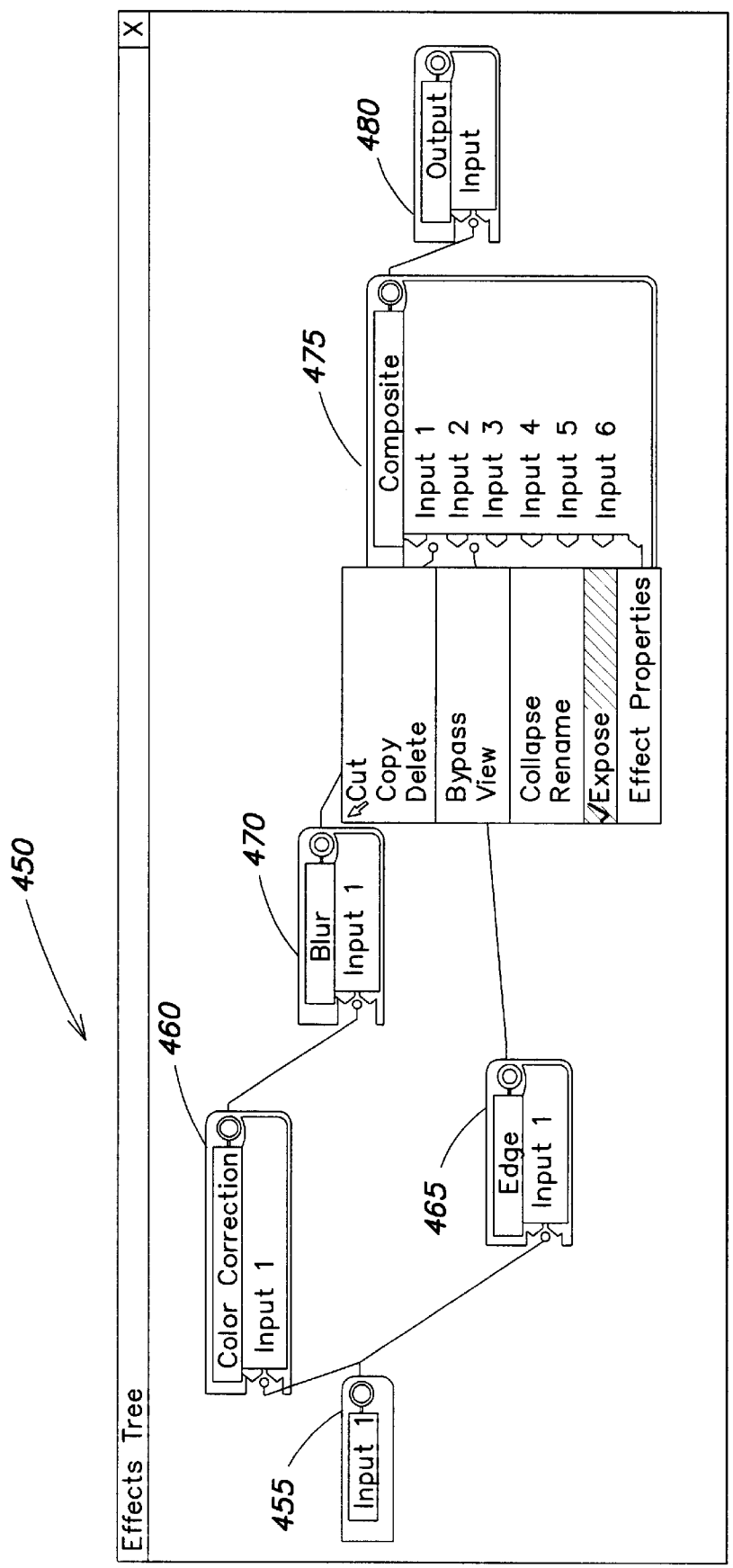
FIG. 4C depicts a menu for exposing an effect in an effect tree.

In another embodiment of the invention, an individual effect within an effect tree such as effect tree 450 may be marked as "exposed", as shown by the selection of the blur effect in FIG. 4C, The 'expose' feature determines which effects from the set held by the tree will be collected into a single editor when the user invokes an editor for the tree as a whole. The "expose" mechanism allows an advanced user to build complex effect trees without exposing all of the effects to editing. As an example, a selective color correction effect tree consists of a keyer effect for picking a color to replace in the image, a color correction effect for choosing the replacement color, and a key combiner effect for ensuring that the alpha of the of the original image is not affected by the keying process.

The key combiner effect in the above effect tree is not appreciated by most users to be a part of the selective color correction process, and thus the expose mechanism allows the detail regarding this effect to be hidden from the user, who is only really concerned about choosing a color to replace an existing color. As will be discussed in more detail below, the expose mechanism permits the presentation of a more user friendly user interface in the associated property editor for the effect tree.

The tree-like sequence of effects may be named and stored in non-volatile memory as a preset for future use as a single effect tree to be later retrieved for application to an object, or may be included in other stored effect trees to generate an even more complex effect. Therefor, a stored effect tree becomes a stored object that is available for modifying an input object to produce an output in a deterministic fashion. It may be retrieved from storage and also used as a mask to create other effect trees by editing the original effect or by adding or deleting other effects to create the new effect tree.

Property Editor

Having described the concept of a effect tree in accordance with graphics imaging system 10 and its ability to apply multiple effects to an object, a property editor for an effect tree, according to the present invention will now be described.

A property editor is software that allows the user to define the properties of an individual object within an effect tree. As was discussed previously, prior implementations of a property editor, associated with effect trees, required the user to select each individual effect from the effect tree graph prior to changing the properties of that effect. A separate property editor was then opened for each effect, and the parameter values associated with the effect could then be modified. If changes to another effect were desired, the effect tree graph had to be re-entered in order to invoke the property editor for that effect. As was pointed out, the need to return to the effect tree graph to select each effect prior to invoking its property editor is cumbersome and required frequent switching by the user between property editors and the effect tree graph.

In one embodiment of the present invention, a single instance of a property editor is utilized for editing all of the exposed effects of the effect tree. Advantageously, the user is no longer is required to navigate between the effect tree graph and property editor in order to select the property editor associated with an effect in the effect tree.

Figure 5:
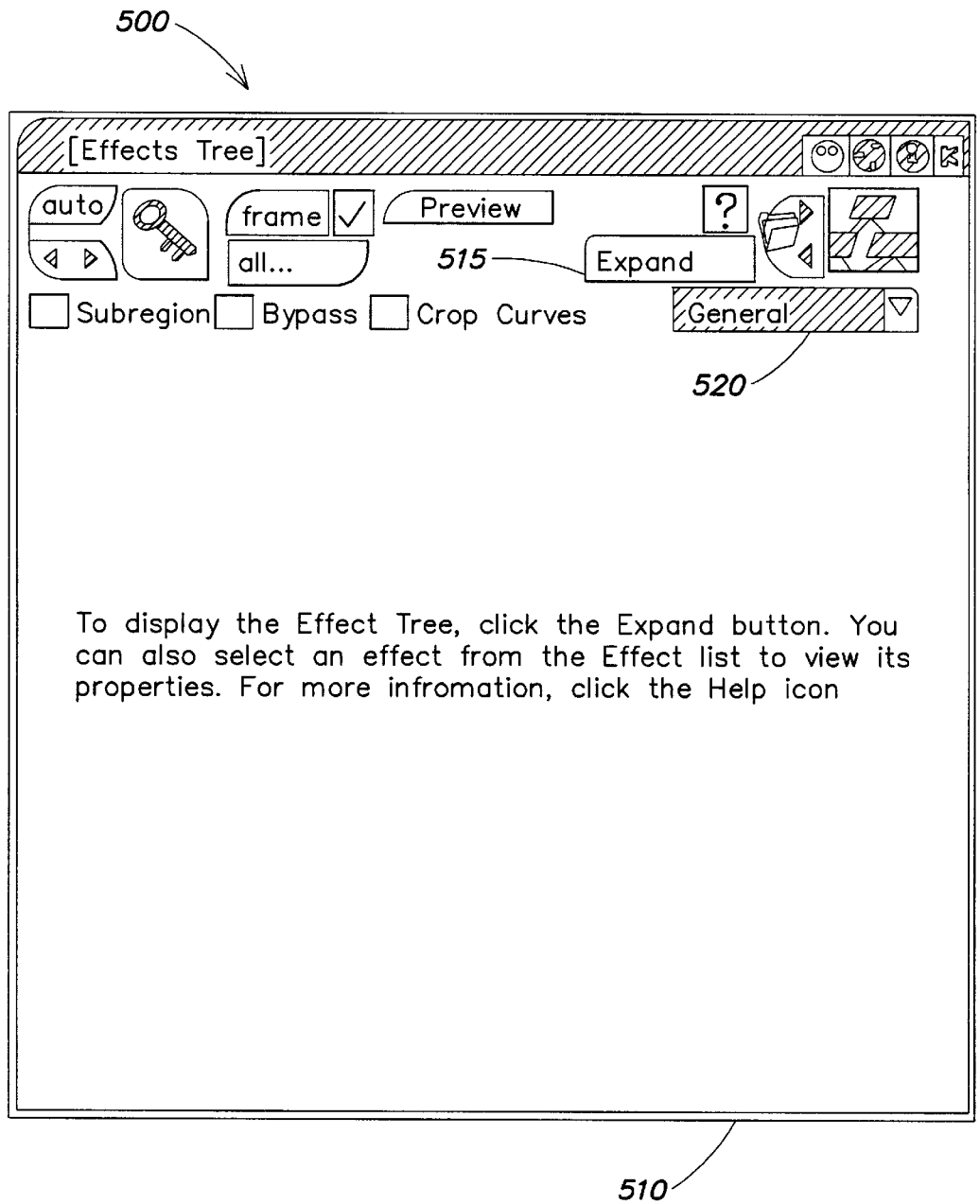
FIG. 5 shows a user interface in a property editor, according to the invention.

Referring to FIG. 5 there is shown the user interface 510 for the property editor 500, associated with an effect tree according to the present invention. The property editor 510 may be invoked to display in graphical form as shown in FIG. 4B the currently activated effect tree and to modify the parameters associated with the individual effects within the effect tree. Referring to FIG. 5, the current effect tree may be displayed by clicking on the expand button 515 with pointer device 24. The properties of a individual effect within the effect tree may be viewed by selecting the effect from the effect list 520. It is noted that advantageously the property editor 500 presents for selection by the user the list of effects associated with the currently active effect tree in the list of individual effects 520. Effect list 520 is determined by analyzing the associated effect tree for its structure including its tree-like structure. However, the property editor 500 includes in the list of individual effects 520 only those effects that are marked as exposed, and therefor does not display parameter values associated with the unexposed effects. As opposed to conventional editors associated with an effect tree, the effect tree graph does not have to be entered to view the properties of each effect, but rather each effect may be reviewed from a single instance of the property editor. In fact, a view of the effect tree never needs to be exposed to the user. The process of applying a effect tree preset (specifying a previously saved effect tree), setting parameters, processing the result can all be carried out without exposing a view of the effect tree to the user.

Figure 6:
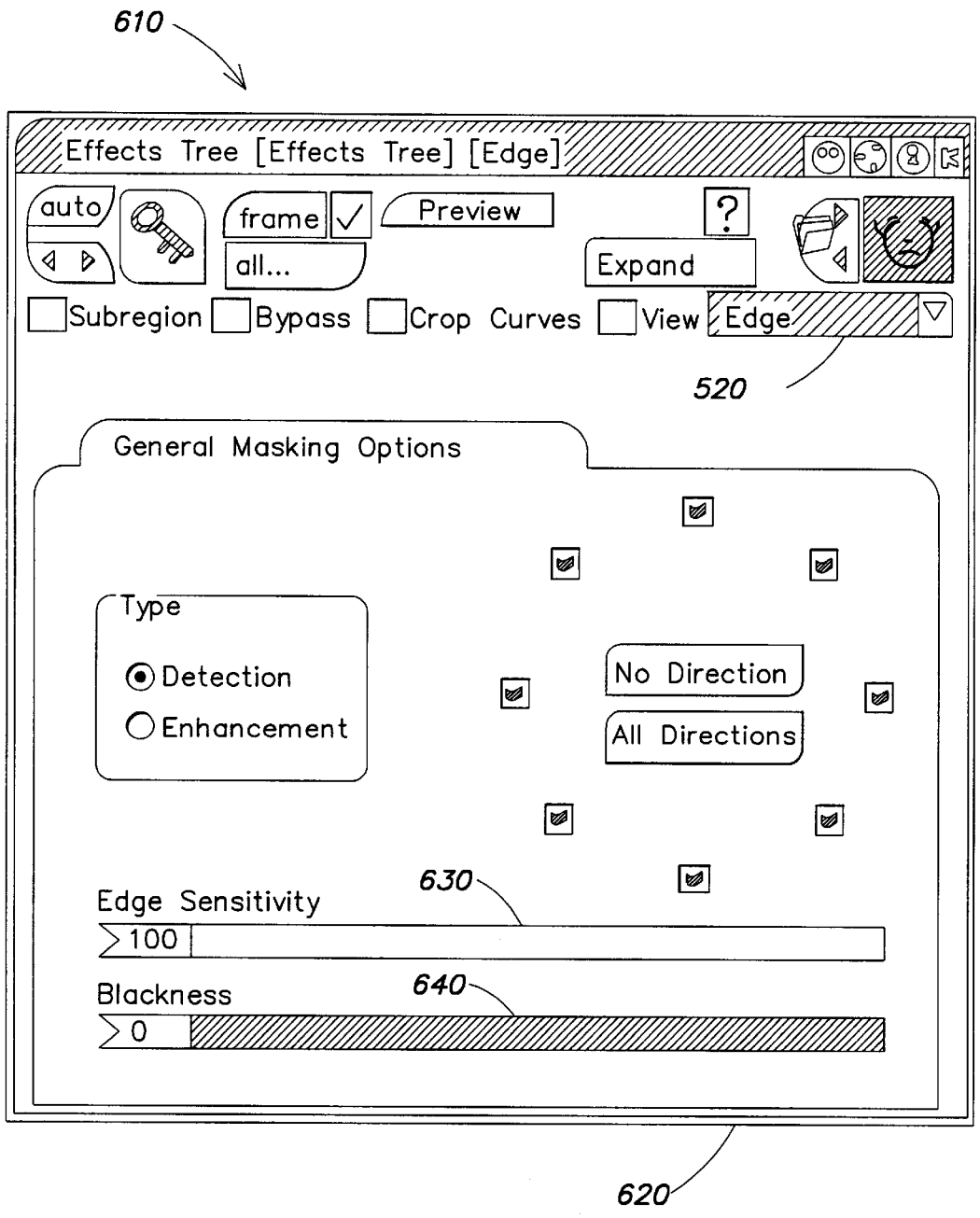
FIG. 6 shows a user interface in a property editor for specifying properties of an effect tree, according to the invention.

For illustrative purposes, it will be assumed that effect tree 450 of FIG. 4B is the active effect tree, and the property editor will be described with reference to that effect tree. Referring now to FIG. 6 there is shown the user interface 610 for the property editor 500 of the current invention, after the edge effect 465 of FIG. 4B has been selected from the effect list 520. A property screen 620 is displayed to present the parameter values associated with the effect selected from the effect list 520. Using the edge effect as the example, the parameter values for edge sensitivity 630 and blackness 640 are displayed for the user to review and possibly modify.

The present invention provides for a property editor in a graphics image system in order to specify parameter values for effects in an effect tree. A separate instance of the property editor is not invoked for each effect within the effect tree, but rather the property editor permits the modification of multiple effects from the same instance of the editor. Advantageously, the user is not required to navigate between a view of the effect tree and the property editor in order to edit effects.

Having described the invention, it should be apparent to those of ordinary skill in the art that the foregoing is illustrative and not limiting. Numerous modifications and other embodiments are within the scope of one of ordinary skill in the art and are contemplated as falling within the scope of the invention as defined by the appended claims.

We claim:

1. A property editor, operable on a computer system, for displaying parameter values associated with properties of an effect tree, wherein the effect tree includes a directed acyclic graph of a plurality of individual effects wherein an output of one effect is an input to another effect, and wherein the effect tree is displayed as a graph associated with the property editor in which each of the individual effects is a node of the graph, the property editor comprising:

means for enabling a user to specify effects and to link effects together to define the effect tree;

an identification means for identifying the individual effects in the effects tree;

a presentation means for presenting, in the property editor, a list of the individual effects in the effects tree;

a selection means for receiving an indication of a selection by the user of one individual effect from the list of individual effects;

display means for displaying, in the property editor, said parameter values of said selected individual effect; and means for receiving changes by the user to the displayed parameter values of the selected individual effect.

2. The property editor of claim 1, wherein the presentation means presents the list of individual effects in one instance of the property editor.

3. The property editor of claim 1, wherein the identification means identifies only exposed individual effects in the list of individual effects.

4. The property editor of claim 3, wherein each of the individual effects includes an expose data element that determines if the individual effect is exposed within the property editor.

5. A method for displaying in a property editor parameter values associated with an individual effect within an effect tree, wherein the effect tree includes a directed acyclic graph of a plurality of individual effects wherein an output of one effect is an input to another effect, and wherein the effect tree is displayed as a graph associated with the property editor in which each of the individual effects is a node of the graph, the method comprising:

enabling a user to specify effects and to link effects together to define the effect tree;

identifying the individual effects in the effect tree;

presenting, in the property editor, a list of the individual effects in the effect tree;

receiving an indication of a selection by the user of one individual effect from the list of individual effects in the effect tree;

displaying the parameter values of the selected individual effect in the property editor; and receiving changes by the user to the displayed parameter values of the selected individual effect.

6. The method of claim 5, wherein presenting includes presenting the list of individual effects in one instance of the property editor.

7. The property editor of claim 5, wherein identifying further includes identifying only exposed individual effects in the list of individual effects.

8. The method of claim 7, wherein each of the individual effects includes an expose data element that determines if the individual effect is an exposed individual effect.

9. A computer readable medium having computer instructions stored thereon for implementing a method for displaying in a property editor parameter values associated with an individual effect within an effect tree, wherein the effect tree includes a directed acyclic graph of a plurality of individual effects wherein an output of one effect is an input to another effect, and wherein the effect tree is displayed as a graph associated with the property editor in which each of the individual effects is a node of the graph, said method comprising:

enabling a user to specify effects and to link effects together to define the effect tree;

identifying the individual effects in the effect tree;

presenting, in the property editor, a list of the individual effects in the effect tree;

receiving an indication of a selection by the user of one individual effect from the list of individual effects in the effect tree;

displaying the parameter values of the selected individual effect in the property editor; and receiving changes by the user to the displayed parameter values of the selected individual effect.

10. The computer readable medium of claim 9, wherein the list of individual effects presented in the property editor includes only exposed individual effects.

11. The computer readable medium of claim 10, wherein each of the individual effects includes an expose data element that determines if the individual effect is an exposed individual effect.

12. A graphical user interface for a system for editing an effect, wherein an effect is defined in a tree-like structure of a plurality of individual effects wherein an output of one individual effect is an input to another individual effect, the graphical user interface comprising:

means for enabling a user to specify individual effects and to link the individual effects together to define the effect as a tree-like structure;

means for displaying a graphical representation of the effect as a tree-like structure displaying each of the plurality of individual effects in the effect;

means for presenting a property editor associated with the effect, wherein the property editor includes:

means for presenting a list of a plurality of the individual effects in the property editor;

means for receiving an indication of a selection by the user of one of the plurality of the individual effects from the presented list;

means for displaying parameter values associated with the selected individual effect in the property editor; and means for receiving changes by the user to the parameter values of the selected individual effect.

13. The graphical user interface of claim 12, wherein the list of individual effects presented in the property editor includes only exposed individual effects.

14. The graphical user interface of claim 13, wherein each of the individual effects includes an expose data element that determines if the individual effect is exposed within the property editor.

* * * * *